Patented Apr. 22, 1930

1,755,692

UNITED STATES PATENT OFFICE

WILLY O. HERRMANN AND ERICH BAUM, OF MUNICH, GERMANY, ASSIGNORS TO CONSORTIUM FUR ELEKTROCHEMISCHE INDUSTRIE, OF MUNICH, GERMANY

PROCESS FOR THE PREPARATION OF CONDENSATION PRODUCTS OF ETHYL ALCOHOL

No Drawing. Application filed December 2, 1927, Serial No. 237,332, and in Germany December 18, 1926.

This invention has for its object the production of reaction products from ethyl alcohol and has for its particular object the production of condensation compounds from ethyl alcohol such as, for example, butanol.

We have found that if ethyl alcohol is subjected to the action of certain catalysts at elevated temperatures, condensation and other reaction products can be obtained. The action of catalysts on ethyl alcohol to produce (1) the splitting out of water to form ethylene and, (2) splitting out of hydrogen to produce acetaldehyde is well known. According to the work of Sabatier (La Catalyse en Chimie Organique 1920, p. 275) the nature of the decomposition depends on the catalyst used; these catalysts act mainly to split out water or hydrogen or both. We have found that each of these groups of catalysts can be used at suitable elevated temperatures to condense the alcohol to compounds of higher molecular weight. Of the catalysts mentioned by Sabatier, those which may be classed as acting chiefly "dehydrogenating catalysts", the oxides and carbonates of manganese, magnesium, zinc, vanadium, iron, the alkaline earth metals barium, strontium, calcium and copper act especially well as condensation catalysts. In addition to the oxides and carbonates we have found that other compounds can also be used, e. g. alcoholates. The catalyst may also be a mixture of the above materials.

The condensation reaction can be carried out at elevated or ordinary pressures; preferably the alcohol is circulated at atmospheric pressure over a contact mass coated with the catalysts to be used.

The reaction temperature for our results lies above that temperature at which chiefly only the aldehyde or olefine formation of the prior art has been found to occur. For example, according to Sabatier the most suitable temperature for the aldehyde formation with the majority of the catalysts was below 350° C.; with these catalysts then, our alcohol condensation reactions were found to occur at temperatures above 350° C. Preferably we operate at temperatures between 400 and 500° C.

The rate of passage of the ethyl alcohol vapor in contact with the catalyst may vary over a wide range, and we do not wish to be limited to any space velocity. We have found, however, that especially good results are secured if the alcohol vapors were passed at a rate of about 0.5–2 kilograms of alcohol vapor per hour, per litre of occupied catalyst space. We obtain by such treatment butanol, ethyl acetate, acetone and other products, and in addition some acetaldehyde, hydrogen and small amounts of ethylene. The process is thus suited for the preparation of butanol and acetaldehyde, and at the same time a valuable solvent medium is secured which, without separation into its components, finds many technical applications. Our invention is illustrated by the following examples:

Example I

A catalyst mass was first prepared by the deposition of magnesia on wood charcoal by any of the methods known to the art. Two litres of the granulated charcoal-containing catalyst were placed in a closed vessel and heated to 420–430° C. ethyl alcohol vapor was led through this catalyst at a rate of 500–600 grams per hour. The ethyl alcohol can be vaporized by any suitable method exterior of the catalyst tube or vessel or as in this case by allowing it to drop into the heated tube. In a period of 7 hours there was recovered by condensation 106 grams of product boiling over 78° C., 35 grams butanol and 46 grams ethyl acetate; in addition there was produced in this period 68 grams acetaldehyde.

Example II

A catalyst was prepared of wood charcoal impregnated with manganese carbonate. 200 cc. of this charcoal was placed in a reaction tube, and the whole heated to 450–460° C. Ethyl alcohol vapor was circulated over this catalyst at a rate of about 120–280 grams per hour. At the end of 4 hours there had been obtained by condensation of the off gases, 30 grams product boiling over 78° C. and 15 grams butanol; at the same time there was produced 36 grams of acetaldehyde.

Example III

A catalyst was prepared comprising zinc oxide on granulated wood charcoal. 150 cc. of this catalyst was placed in a reaction tube, and the whole heated to 440-450° C. Ethyl alcohol vapor was passed through this catalyst mass at a rate of about 120 grams per hour. At the end of the 10 hours there had been raised by condensation 36 grams product boiling over 78° C. and 19 grams butanol; at the same time there had been produced 61 grams of acetaldehyde.

Claims:

1. Process for the production of compounds from ethyl alcohol which comprises passing ethyl alcohol vapors in contact with a non-metallic catalyst normally having a dehydrating or dehydrogenating action on ethyl alcohol, said catalyst being maintained above the temperature at which said normal action takes place.

2. Process for the production of reaction products from ethyl alcohol which comprises passing vaporized ethyl alcohol at a temperature between 430-500° C. in contact with a non-metallic catalyst having a dehydrating or dehydrogenating action or ethyl alcohol below that temperature.

3. Process for the production of reaction products from ethyl alcohol which comprises passing vapors of ethyl alcohol over a dehydrogenating acting non-metallic catalyst above the temperature at which chiefly acetaldehyde would be formed from the alcohol by said catalyst.

4. Process for the preparation of butanol from ethyl alcohol which comprises circulating vapors of ethyl alcohol over a dehydrogenating acting non-metallic catalyst above the temperature at which chiefly acetaldehyde would be formed from the alcohol by said catalyst.

5. Process for the production of reaction products from ethyl alcohol which comprises passing vapors of ethyl alcohol over a dehydrogenating acting non-metallic catalyst at a temperature above 430° C. below which chiefly acetaldehyde would be formed from the alcohol by said catalyst.

6. Process for the preparation of butanol from ethyl alcohol which comprises circulating vapors of ethyl alcohol over a dehydrogenating acting non-metallic catalyst at a temperature above 430° C. below which chiefly acetaldehyde would be formed from the alcohol by said catalyst.

7. Process for the production of reaction products from ethyl alcohol which comprises passing vapors of ethyl alcohol over a dehydrogenating acting non-metallic catalyst at a temperature between 430° C. and 500° C. below which chiefly acetaldehyde would be formed from the alcohol by said catalyst.

8. Process for the preparation of butanol from ethyl alcohol which comprises circulating vapors of ethyl alcohol over a dehydrogenating acting non-metallic catalyst at a temperature between 430° C. and 500° C. below which chiefly acetaldehyde would be formed from the alcohol by said catalyst.

9. Process for the production of reaction products from ethyl alcohol which comprises passing vapors of ethyl alcohol over a catalyst comprising a manganese compound at a temperature between 430° C. and 500° C. below which chiefly acetaldehyde would be formed from the alcohol by said catalyst.

10. Process for the preparation of butanol from ethyl alcohol which comprises circulating vapors of ethyl alcohol over a catalyst comprising a manganese compound at a temperature between 430° C. and 500° C. below which chiefly acetaldehyde would be formed from the alcohol by said catalyst.

11. Process for the production of reaction products from ethyl alcohol which comprises passing vapors of ethyl alcohol over a dehydrogenating catalyst comprising manganese carbonate at a temperature between 430° C. and 500° C.

12. Process for the production of butanol from ethyl alcohol which comprises passing vapors of ethyl alcohol over a dehydrogenating acting catalyst comprising manganese carbonate at a temperature between 430° C. and 500° C.

WILLY O. HERRMANN.
ERICH BAUM.